United States Patent [19]

Gottling et al.

[11] 4,350,182

[45] Sep. 21, 1982

[54] OPERATING EQUIPMENT FOR GATE VALVES (PASSAGE VALVES)

[75] Inventors: Helmut Gottling, Isernhagen; Rudolf Moller, Gehrden, both of Fed. Rep. of Germany

[73] Assignee: WABCO Steuerungstechnik GmbH & Co., Hannover, Fed. Rep. of Germany

[21] Appl. No.: 209,432

[22] Filed: Nov. 24, 1980

[30] Foreign Application Priority Data

Dec. 8, 1979 [DE] Fed. Rep. of Germany ....... 2949424

[51] Int. Cl.$^3$ .............................................. F16K 31/06
[52] U.S. Cl. .................................. 137/625.27; 251/65
[58] Field of Search ....................... 137/625.27; 251/65

[56] References Cited

U.S. PATENT DOCUMENTS

| | | | |
|---|---|---|---|
| 2,307,723 | 1/1943 | Anderson | 251/65 X |
| 2,405,127 | 8/1946 | Beach | 251/65 X |
| 2,799,293 | 7/1957 | Clay | 137/625.27 X |
| 2,886,063 | 5/1959 | Ray | 137/625.27 |
| 3,022,799 | 2/1962 | Padula | 137/625.27 |
| 3,172,637 | 3/1965 | Adams | 137/625.27 X |
| 3,185,177 | 5/1965 | Brandenberg | 137/625.27 |
| 3,212,751 | 10/1965 | Hassa | 251/65 |

*Primary Examiner*—Robert G. Nilson
*Attorney, Agent, or Firm*—G. J. Falce

[57] ABSTRACT

A three-way valve device or the like having valving that is operably disposed within a bushing contained in the housing of the valve device, and a permanent magnet that is disposed in surrounding relationship with the bushing so as to be operable along the axial dimension thereof from an inactive position that is magnetically remote from a movable member of the valving to an active position that is in magnetic proximity with the movable valve member, to thereby shift the valve member and accordingly control fluid pressure communication between the valve porting with snap action. In one embodiment of the invention, the permanent magnet is operated by a push-button against the action of a spring, and in a second embodiment, the permanent magnet is encapsulated within a fluid-pressure-operated member subject to fluid pressure on its opposite sides.

4 Claims, 2 Drawing Figures

OPERATING EQUIPMENT FOR GATE VALVES (PASSAGE VALVES)

BACKGROUND OF THE INVENTION

The invention pertains to a snap-acting mechanism for operating the valve member in three-way valves or the like.

For example, in cases of three-way valves with direct mechanical operation, the valve member is moved from is one end position to the other against the force of a spring via a button which may be connected to the valve member of the three-way valve. Due to the fact that in the one end position, the connection between a pressure medium source and a receiver, and in the other end position, the connection between the receiver and the atmosphere is produced, with regard to these known valve devices, it is unavoidable that over the entire stroke of the valve member, the pressure medium source and the receiver are connected with the atmosphere at the same time, which more or less causes loss of pressure medium during the switching phase according to switching speed.

Therefore, the object of the invention is to provide a valve actuating mechanism for valve devices which enable sudden switching of the valve member, so that the pressure medium loss during the switching phase is reduced to a minimum.

A special advantage of the valve actuating mechanism according to the invention is the fact that aside from the reduction of pressure medium loss during the switching phase to an insignificant value, the operating force required to actuate the valve mechanism is also significantly lowered.

BRIEF DESCRIPTION OF THE DRAWINGS

The invention is explained in more detail with reference to the drawings in which:

FIG. 1 shows a valve device according to the present invention, which, for example, is utilized in a pressure-medium controlled facility, for short-term pressure medium movement into a receiver.

Figure 1:
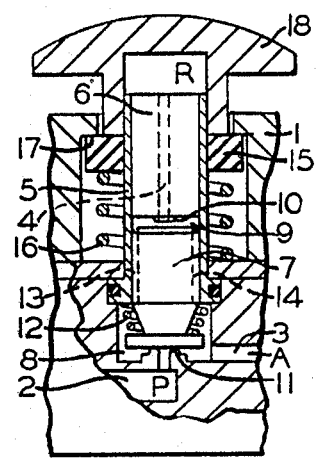
FIG. 1 shows an example of the invention as employed in a manually-operated three-way valve device.

In a valve housing (1) having a pressure medium inlet (2) and two pressure medium outlets (3) (4), there is provided a bushing (5) that is held firmly in the valve housing (1) by a shoulder at the lower end of the bushing (5). At the upper end of bushing (5) is contained a stationary member (6) having a central passage providing the pressure medium outlet (4). A movable valve member (7) is slidably operable in the lower section of bushing (5) slides into the anchor tube (5) and separates an annular chamber (8) in the valve housing (1) from a vent chamber (9) formed between the movable valve member (7) and the stationary member (6). The central passage forming the pressure medium outlet (4) (9) terminates in an annular lip forming a valve seat (10). Surrounding inlet (2) within chamber 8 is an annular lip forming a valve seat (11). A spring (12) acts between the lower end of the bushing (5) and a shoulder on movable valve member (7) to hold the valve member in engagement with valve seat (11) of the pressure medium inlet (2). The pressure medium inlet (2) is connected to a pressure medium source which is not shown. The pressure medium outlet (3) is connected with a receiver that is not shown in this example, and the pressure medium outlet (4) leads to the atmosphere via the central passage in stationary member 6. Two axial grooves (13), (14), are axially formed in valve member (7) via which the inlet fluid pressure in chamber (8) can be connected with vent chamber (9). Movably carried on bushing (5) is ring-shaped, permanent magnet (15), which is urged by a spring (16) against a stop shoulder (17) formed by the housing (1). A push-button (18) is positioned over the end of bushing (5) and rest against the permanent magnet (15).

The function of this operating equipment is explained in detail as follows:

In the position shown, the inlet medium source is closed off from outlet 3 leading to the receiver. The pressure medium outlet (4), which leads to the atmosphere is connected with outlet (3) and to the receiver via open valve seat (10), the grooves (13, 14), in movable valve member (7), and the chamber (8), so that the receiver is vented. If the receiver is to be pressurized, the push-button (18) is depressed against the force of spring (16) and the permanent magnet (15) is taken with it. During this shifting phase the permanent magnet (15) is moved axially toward the valve member (7), thereby increasing the magnetic force which is transferred on to the valve member (7). As the magnetic force exceeds the force of the spring (12), which holds the valve member (7) on the valve seat (11), the valve member (7) moves suddenly into its other end position, in which the valve member (7) engages valve seat (10) and is disengaged from seat (11). Thus, the pressure medium source at inlet (2) is cut off from atmosphere via outlet (4) and is connected with the receiver via the valve seat (11), the annular chamber (8), and the pressure medium outlet (3). When the push-button (18) is subsequently released, permanent magnet (15) is moved away from valve member (7) by spring (16) so that the magnetic field also is shifted away from valve member (7). As soon as the force of spring (12) exceeds the magnetic force, valve member (7) again suddenly switches back into its original end position, in which valve member (7) is engaged with valve seat (11) and outlet (4) is again connected with the receiver via valve seat (10), grooves (13, 14) and the pressure medium outlet (3).

Figure 2:
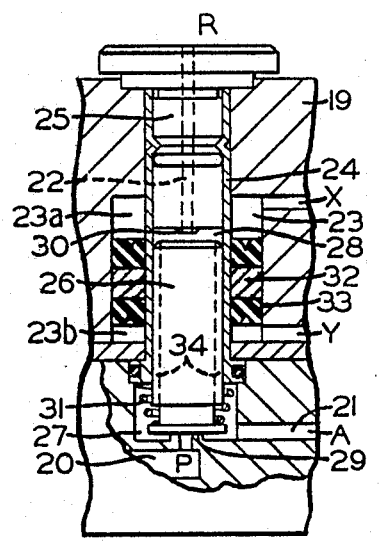
FIG. 2 shows a further development of the invention as employed in a pneumatically-operated three-way valve device

FIG. 2 shows the operation of the magnet with compressed air as opposed to manual activation.

The valve housing (19) includes a pressure medium inlet (20) as well as two pressure medium outlets (21, 22). The pressure medium outlet (21) is connected with a receiver, which is not shown, and the pressure medium outlet (22) is connected with the atmosphere. In the housing (19) a primary chamber (23) is provided, which includes two fluid pressure connections X and Y. A bushing (24), which axially penetrates the chamber (23), is firmly secured in the valve housing (19). The bushing (24) is closed off toward the outer wall of the valve housing by a closure member (25), which is formed with a central passage 22 providing pressure medium outlet (22). Bushing (24) further serves as a guide for a movable valve member (26). At one end, the valve member (26) forms with the valve housing an inlet chamber (27), which is provided between pressure medium inlet (20) and pressure medium outlet (21), and at the other end forms an outlet chamber (28) located between the closure member (25) and the bushing (26).

The pressure medium inlet (20) as well as the central passage forming pressure medium outlet (22) terminate in an annular valve seat (29) and (30) respectively. Valve seat (29) forming pressure inlet (20) cooperates with valve member (26) to form a supply valve, and the valve seat (30) forming pressure medium outlet (22) which leads to the atmosphere, cooperates with the valve member (26) to form an exhaust valve.

In the device, which has been described to this point, valve member (26) is supported by a spring (31) which rests against bushing (24) and a flange of the anchor (26) on which valve seat (29) and of the pressure medium inlet (20) is held. A ring-shaped permanent magnet (32) is imbedded in an elastomeric, plastic or other such material (33) suitable for fluid pressure sealing, which material surrounds the bushing (24) and separates the chamber (23) into two separate chambers (23a and 23b), whereby the connection X is associated with chamber (23a) and the connection Y is associated with chamber (23b). An axial groove (34) is provided in valve member (26), through which the inlet chamber (27) can be connected with the pressure medium chamber (28).

As opposed to the example according to FIG. 1, the permanent magnet (32), which switches the anchor (26) with snap-action from one end position to another is not operated via a push-button, but through pressurization of the respective chambers (23a and 23b).

We claim:

1. A valve device having at least one inlet, at least two outlets, and valve means having a first position for interrupting fluid pressure communication between said one inlet and one of said outlets, while concurrently establishing fluid pressure communication between said one outlet and the other of said outlets, and a second position for establishing fluid pressure communication between said one inlet and said one outlet, while concurrently interrupting fluid pressure communication between said one and said other of said outlets, said valve device further comprising:
   (a) a bushing carried in the housing of said valve device;
   (b) said valve means including
      (i) a stationary valve member fixed in said bushing; and
      (ii) a movable valve member operably disposed in said bushing to move axially therein relative to said stationary member;
   (c) a first spring means for biasing said movable member in a direction to establish said first position of said valve means;
   (d) magnetic means operably disposed in surrounding relationship with said bushing for exerting a magnetic force on said movable valve member in opposition to said first spring means;
   (e) second spring means for urging said magnetic means toward an inactive position adjacent said stationary member, in which the magnetic force acting on said movable valve member is less than the biasing force of said first spring means; and
   (f) actuator means operative in response to an actuating force thereto for axially displacing said magnetic means in opposition to said second spring means from said inactive position to an active position in which the magnetic force acting on said movable member is greater than the biasing force of said first spring means to thereby effect shifting of said movable valve member toward engagement with said stationary valve member with snap action to establish said second position of said valve means, said magnetic force on said movable member in said active position of said magnetic means being less than the force exerted thereon by said second spring means, so that upon release of the actuating force on said actuator means, said second spring means is effective to reset said magnetic means to said inactive position.

2. A valve device as recited in claim 1, wherein said actuator means comprises a manually-operable button carried telescopically on said bushing so as to engage said magnetic means to effect movement thereof to said active position when said button is operated.

3. A valve device as recited in claim 2, wherein said magnetic means is a permanent magnet.

4. A valve device as recited in claim 3, wherein said permanent magnet is ring-shaped so as to surround said bushing.

* * * * *